United States Patent
Iijima et al.

(10) Patent No.: US 9,469,770 B2
(45) Date of Patent: Oct. 18, 2016

(54) RUST-PREVENTIVE COATING

(71) Applicants: Yuken Industry Co., Ltd., Kariya-shi (JP); Honda Motor Co., Ltd., Tokyo (JP)

(72) Inventors: Masayuki Iijima, Kariya (JP); Masayuki Tsujimoto, Kariya (JP); Kenji Suto, Wako (JP); Hideaki Takada, Wako (JP)

(73) Assignees: Yuken Industry Co., Ltd., Kariya-Shi (JP); Honda Motor Co., Ltd., Tokyo (JP)

( * ) Notice: Subject to any disclaimer, the term of this patent is extended or adjusted under 35 U.S.C. 154(b) by 666 days.

(21) Appl. No.: 13/705,752

(22) Filed: Dec. 5, 2012

(65) Prior Publication Data

US 2013/0143032 A1 Jun. 6, 2013

(30) Foreign Application Priority Data

Dec. 6, 2011 (JP) ................... 2011-267130

(51) Int. Cl.
C09D 5/10 (2006.01)

(52) U.S. Cl.
CPC ............ *C09D 5/106* (2013.01); *C09D 5/103* (2013.01); *Y10T 428/25* (2015.01); *Y10T 428/31663* (2015.04); *Y10T 428/31678* (2015.04)

(58) Field of Classification Search
None
See application file for complete search history.

(56) References Cited

U.S. PATENT DOCUMENTS

| | | | |
|---|---|---|---|
| 2005/0129964 A1 | 6/2005 | Hugo | |
| 2009/0318612 A1* | 12/2009 | Plehiers et al. | ............... 524/588 |
| 2010/0151257 A1* | 6/2010 | Suzuki et al. | ................ 428/447 |
| 2010/0285226 A1 | 11/2010 | Suzuki | |

FOREIGN PATENT DOCUMENTS

| | | |
|---|---|---|
| JP | 200286066 A | 3/2002 |
| JP | 2005516808 A | 6/2005 |
| JP | 4111531 B2 | 4/2008 |
| JP | 201313855 A | 1/2013 |
| WO | 2009093319 A1 | 7/2009 |

* cited by examiner

*Primary Examiner* — Cheng Huang
(74) *Attorney, Agent, or Firm* — The Webb Law Firm

(57) ABSTRACT

A rust-preventive coating comprises two layers of coatings contacted with each other, wherein among the two layers of coatings, a first coating as a coating at an inner layer side is obtained from a first paint composition that contains a first metal-based powder and a first binder component, among the two layers of coatings, a second coating as a coating at an outer layer side is obtained from a second paint composition that contains a second metal-based powder and a second binder component, and compositions are different between the first metal-based powder and the second metal-based powder.

13 Claims, No Drawings

RUST-PREVENTIVE COATING

TECHNICAL FIELD

The present invention relates to a rust-preventive coating having particularly excellent anticorrosive property.

BACKGROUND ART

In the field of a paint for the purpose of rust prevention such as for a steel member, a rust-preventive paint has widely been used which primarily contains zinc powder and chromic acid. This paint can keep the zinc powder stable for a long time due to the passivation behavior caused by hexavalent chromium, thus providing an excellent storage stability of liquid. In addition, a coating comprised of this paint that contains zinc powder prevents corrosion of an underlying member (substrate) because the well-known sacrificial anticorrosive function of zinc effectively works, and an excellent rust-preventive effect can thereby be obtained.

In recent years, however, manufacturers of consumer products such as automobiles and precision equipments contemplate to proceed to no use of substances that contain hexavalent chromium (referred also to as "hexavalent chromium based substances", hereinafter). Accordingly, also in the field of rust-preventive paints, there is a strong demand for paints absolutely free from hexavalent chromium based substances.

One example of such rust-preventive paints that contain no hexavalent chromium based substance is a kind of paint in which zinc powder and a binder component are dispersed or dissolved in an organic solvent, i.e. a zinc-rich paint. Such zinc-rich paints are categorized into organic ones and inorganic ones, among which inorganic ones having organic silicon compounds as vehicles are superior in terms of durability thus being used as basecoat agents in heavy-duty anticorrosive painting such as for ships and bridges.

This type of inorganic-based zinc-rich paint for basecoat is used to usually be a thick coating of 100 µM or more, but Patent Document 1 discloses a rust-preventive paint which can form a coating having an excellent anticorrosive property even if being a thin coating of about 10 µm. Primary use of such thin coatings having high anticorrosive property is for business equipments, electrical apparatuses, automobiles, etc, and specifically for secondarily fabricated components, such as fasteners including bolts and nuts, attachments including clamps and clips, and press-molded products including plates, housings, hinges and panels. These members are required to have high accuracy in assembling and at the same time high level of strength and adhesiveness of their coatings because they may be subjected to a large shear force when being fabricated and assembled.

Patent Document 1: Japanese Patent No. 4111531

SUMMARY OF THE INVENTION

Problems to be Solved by the Invention

The rust-preventive paint disclosed in Patent Document 1 is a favorable paint in regard to the point that a member having excellent anticorrosive property can be provided even with a thin coating formed of the paint.

In recent years, however, the level of rust-preventive function required for rust-preventive coatings is more and more being heightened, and there is a demand for a coating with particularly excellent rust-preventive function even if being a thin coating of about 10 µm.

An object of the present invention is, therefore, to provide a coating that satisfies the above requirement, i.e. a coating that has a particularly excellent rust-preventive function.

Means for Solving the Problems

As a result of intensive studies, the present inventors have discovered that a laminated coating is particularly excellent in its rust-preventive function, in which two types of paint compositions are prepared to contain binder components and metal-based powders where the compositions of the metal powders are different, and two types of coatings formed from these paint compositions are laminated to contact with each other.

Aspects of the present invention accomplished on the basis of the above discovery are as follows.

(1) A rust-preventive coating comprising a laminated body comprising two layers of coatings contacted with each other, wherein, among the two layers of coatings, a first coating as a coating at an inner layer side is obtained from a first paint composition that contains a first metal-based powder and a first binder component, among the two layers of coatings, a second coating as a coating at an outer layer side is obtained from a second paint composition that contains a second metal-based powder and a second binder component, and compositions are different between the first metal-based powder and the second metal-based powder.

(2) The rust-preventive coating as set forth in the above (1), wherein the first metal-based powder comprises a first zinc-based powder comprising one or more selected from zinc powders and zinc alloy powders, and the second metal-based powder comprises: a second zinc-based powder comprising one or more selected from zinc powders and zinc alloy powders; and a second aluminum-based powder comprising one or more selected from aluminum powders and aluminum alloy powders.

(3) The rust-preventive coating as set forth in the above (1), wherein the first metal-based powder comprises: a first zinc-based powder comprising one or more selected from zinc powders and zinc alloy powders; and a first aluminum-based powder comprising one or more selected from aluminum powders and aluminum alloy powders, the second metal-based powder comprises: a second zinc-based powder comprising one or more selected from zinc powders and zinc alloy powders; and a second aluminum-based powder comprising one or more selected from aluminum powders and aluminum alloy powders, and R1<R2 is satisfied where R1 represents a first aluminum ratio as a mass ratio of the first aluminum-based powder to whole of the first metal-based powder and R2 represents a second aluminum ratio as a mass ratio of the second aluminum-based powder to whole of the second metal-based powder.

(4) The rust-preventive coating as set forth in the above (2), wherein a second aluminum ratio R2 as a mass ratio of the second aluminum-based powder to whole of the second metal-based powder is less than 50 mass %.

(5) The rust-preventive coating as set forth in the above (1), wherein at least one of the first metal-based powder and the second metal-based powder has a scale form.

(6) The rust-preventive coating as set forth in the above (1), wherein a contained amount of the first metal-based powder in the first paint composition is 20 mass % or more and 60 mass % or less, and a contained amount of the second metal-based powder in the second paint composition is 20 mass % or more and 60 mass % or less.

(7) The rust-preventive coating as set forth in the above (1), wherein at least one of the first binder component and the second binder component contains an inorganic binder component.

(8) The rust-preventive coating as set forth in the above (7), wherein the inorganic binder component includes, on the basis of whole paint, 5 mass % or more and 40 mass % or less of an organic silicon compound and 0.05 mass % or more and 2 mass % or less of an organic titanate compound.

(9) The rust-preventive coating as set forth in the above (8), wherein the organic silicon compound contained in the inorganic binder component comprises one or more compounds selected from a group consisting of tetraalkyl silicate compounds having an alkyl group which has one to three carbon atoms and oligomers thereof.

(10) The rust-preventive coating as set forth in the above (8), wherein the organic titanate compound contained in the inorganic binder compound comprises an organic compound represented by a general formula of $Ti(X)_4$ and an oligomer thereof, where X represents one or more functional groups selected from a group consisting of: alkoxy groups having one to four carbon atoms; chelating substituent groups; and hydroxyl group.

(11) The rust-preventive coating as set forth in the above (1), wherein at least one of the first binder component and the second binder component contains an organic binder component.

(12) The rust-preventive coating as set forth in the above (1), wherein at least one of the first paint composition and the second paint composition is a nonaqueous composition.

(13) A rust-preventive member comprising the rust preventive coating as set forth in either one of the above (1) to (12) on a substrate.

(14) The rust-preventive member as set forth in the above (13), further comprising an overcoat layer provided at outside the rust-preventive coating.

Advantageous Effect of the Invention

The rust-preventive coating according to the present invention has a particularly excellent anticorrosive property even if being a thin coating of about 10 μm.

EMBODIMENTS FOR CARRYING OUT THE INVENTION

A rust-preventive coating according to one embodiment of the present invention comprises a laminated body comprising two layers of coatings contacted with each other. Details of the rust-preventive coating according to the present embodiment will hereinafter be described with reference to an example where the rust-preventive coating comprises a first coating as a coating at an inner layer side and a second coating as a coating at an outer layer side, and the first coating is formed on a substrate.

1. Relationship of Metal-Based Powders Contained in Each Coating

Among the two layers of coatings involved in the rust-preventive coating according to the present embodiment, the first coating as a coating at an inner layer side is obtained from a first paint composition that contains a first metal-based powder and a first binder component, and the first metal-based powder is fixed due to substances based on the first binder component (in particular primarily due to curing substances in the binder component) to make the first coating in a coating form.

Similarly, among the two layers of coatings involved in the rust-preventive coating according to the present embodiment, the second coating as a coating at an outer layer side is obtained from a second paint composition that contains a second metal-based powder and a second binder component, and the second metal-based powder is fixed due to substances based on the second binder component (in particular primarily due to curing substances in the binder component) to make the second coating in a coating form.

Compositions in respective metal-based powders contained in the first coating and the second coating are made to be different from each other thereby allowing the rust-preventive coating according to the present embodiment, which comprises these coatings, to have an excellent anticorrosive property. Although the reason thereof is not specified, some electrochemical interaction may possibly occur between the first coating and the second coating.

In a preferable specific example (first specific example) of the rust-preventive coating according to the present embodiment, the first metal-based powder comprises a first zinc-based powder comprising one or more selected from zinc powders and zinc alloy powders, and the second metal-based powder comprises: a second zinc-based powder comprising one or more selected from zinc powders and zinc alloy powders; and a second aluminum-based powder comprising one or more selected from aluminum powders and aluminum alloy powders.

In another preferable specific example (second specific example) of the rust-preventive coating according to the present embodiment, the first metal-based powder comprises: a first zinc-based powder comprising one or more selected from zinc powders and zinc alloy powders; and a first aluminum-based powder comprising one or more selected from aluminum powders and aluminum alloy powders, the second metal-based powder comprises: a second zinc-based powder comprising one or more selected from zinc powders and zinc alloy powders; and a second aluminum-based powder comprising one or more selected from aluminum powders and aluminum alloy powders, and $R1<R2$ is satisfied where R1 represents a first aluminum ratio as a mass ratio of the first aluminum-based powder to whole of the first metal-based powder and R2 represents a second aluminum ratio as a mass ratio of the second aluminum-based powder to whole of the second metal-based powder.

Although the reason is not known exactly, the rust-preventive coating according to the second specific example may exhibit higher anticorrosive property than the rust-preventive coating according to the first specific example. That is, higher anticorrosive property is sometimes obtained by the first coating at the inner layer side comprising the metal powder that comprises a zinc-based material and an aluminum-based material rather than comprising the metal powder that consists of a zinc-based material. In particular, this tendency may frequently be observed when the first aluminum ratio R1 and the second aluminum ratio R2 falls within a range of $1<R2/R1<2$.

If, however, the second aluminum ratio R2 is unduly high, then the anticorrosive property of the rust-preventive member may tend to be deteriorated. Therefore, the second aluminum ratio R2 is preferred not to be unnecessarily increased, and specifically preferred is less than 50 mass %.

2. Types, Forms and Other Features of Metal Powders

The description will then be directed to the first or the second metal-based powder to be contained in the first or the second coating. These metal-based powders can be provided with similar characteristics, and the first metal-based powder will accordingly be described as a specific example in the description below.

Examples of an aluminum alloy for the first aluminum-based powder include Al—Cu, Al—Mn, Al—Si, Al—Mg, Al—Mg—Si and Al—Zn based alloys. Examples of a zinc alloy for the first zinc-based powder include Zn—Ni, Zn—Sn, Zn—Fe, Zn—Al and Zn—Al—Mg.

The first metal-based powder preferably has a scale form in order for the coating to have a high anticorrosive property even with reduced thickness of the first coating which contains the first metal-based powder. Being in such a scale form allows a structure to be achieved in which particles of the first metal-based powder are laminated along the thickness direction in the first coating, and more specifically particles of the first metal-based powder are laminated so that the longest axes thereof are directed in the in-plane direction of the surface of the substrate. This laminated structure contributes to an advantageous effect that, even if cracks are generated in the first coating due to contraction caused by curing of the binder component, those cracks are suppressed from progressing, and such large cracks that expose the substrate are prevented from occurring.

When the first metal-based powder has a scale form, it is preferred that an average thickness of the first metal-based powder is ½₀₀ or more and ½ or less relative to an average thickness of the first coating, and an average value of longitudinal diameter (length of the maximum length portion of the scale form) of the first metal-based powder is 10 times or more and 50 times or less relative to the average thickness of the first metal-based powder. For example, if the thickness of the first coating is about 10 μm, then it is preferred that the average thickness of the first metal-based powder having the scale form is 0.05 μm or more and 5 μm or less, and the average value of longitudinal diameter thereof is 0.5 μm or more and 100 μm or less.

Moreover, even in a condition where variations occur in the thickness of the first coating depending on the coating condition for the first paint composition for the first coating, if the average value of longitudinal diameter of the first metal-based powder is 1.0 μm or more and 50 μm or less, particularly preferably 4.0 μm or more and 20 μm or less, and the average thickness of the scale form is 0.05 μm or more and 1.0 μm or less, particularly preferably 0.05 μm or more and 0.5 μm or less, then cracks are unlikely to occur even during a process, such as a baking process, for forming a coating from the liquid layer comprised of the paint composition, and the first coating can be obtained to have a particularly excellent rust-preventive property.

Note that, if the average value of longitudinal diameter is excessively smaller than the above ranges, then the structure cannot easily be obtained in which powders of the metal-based powder having the scale form are laminated in the first coating, and the suppressing effect for the crack progressing tends to be reduced. If, on the other hand, the average value of longitudinal diameter is excessively larger than the above ranges, then the distribution of the first metal-based powder will be coarse, and the rust-preventive property may possibly be negatively affected.

Note also that, if the average thickness of the scale form in the first metal-based powder is smaller than the above ranges, then the scale form may easily be destroyed during the stirring/kneading operation for the paint and become difficult to be formed, and the laminated structure will thus be unlikely to be obtained. If, on the other hand, the average thickness of the scale form is larger than the above ranges, then the structure cannot easily be obtained in which plural metal-based powder particles are laminated along the thickness direction of the coating, and the suppressing effect for the crack progressing may be reduced.

3. Paint Composition

The description will subsequently be directed to the first or the second paint composition for the first or the second coating. These paint compositions can be provided with similar characteristics, and the first paint composition will accordingly be described as a specific example in the description below.

The paint composition for a coating which constitutes the rust-preventive coating according to the present embodiment contains the first metal-based powder and the first binder component.

The type and form of the first metal-based powder are as described above. The composition ratio of the first metal-based powder in the first paint composition is preferably within a range of 20% or more and 60% or less as a percentage by mass relative to the whole paint, and more preferably 30% or more and 50% or less. If this ratio is unduly high, then there is a concern that the first paint composition is difficult to be coated in a form of thin coating and the strength of obtained first coating tends to decrease. If, however, this ratio is unduly low, then there is a concern that cracks tend to easily progress, in which case the rust-preventive property of the coating may possibly be deteriorated.

The type of the first binder component contained in the first paint composition is not particularly limited. An inorganic binder component may be contained therein, and alternatively or in addition to, an organic binder component may be contained.

The first paint composition may be a nonaqueous composition or may also be an aqueous composition. The nonaqueous composition is preferred because the possibility is low that the first metal-based powder contained in the paint composition may be corroded during storage.

The description will hereinafter be directed to the case as an example where the first paint composition is a nonaqueous composition and the first binder component is an inorganic binder component.

The nonaqueous inorganic paint composition as one example of the above first paint composition is comprised of a nonaqueous liquid-form composition that contains: an inorganic binder including 5 mass % or more and 40 mass % or less of an organic silicon compound and 0.05 mass % or more and 2 mass % or less of an organic titanate compound; 20 mass % or more and 60 mass % or less of a first metal-based powder; and 10 mass % or more and 60 mass % or less of an organic solvent. Unless otherwise stated hereinafter, "%" for the contained amount of a paint component means the percentage by mass based on the whole paint.

The organic silicon compound comprises one or more selected from alkoxysilanes and hydrolysates thereof. The alkoxy silane is preferred to be a compound represented by a general formula of $(X')Si(X'')_3$.

$X'$ herein is selected from: hydroxyl group; lower alkoxy groups such as methoxy, ethoxy and isopropoxy; lower alkyl groups such as methyl and ethyl; lower alkenyl groups such as vinyl; and lower alkyl groups that contain functional groups, such as γ-glycidoxypropyl, γ-metacryloxypropyl and γ-mercaptopropyl. Each $X''$ is selected from hydroxyl group and alkoxy groups such as methoxy, ethoxy and isopropoxy, and the three $X''$s may be identical or different.

Specific examples of alkoxysilane include, but not limited to, tetramethoxysilane, tetraethoxysilane, methyltrimethoxysilane, methyltriethoxysilane, vinyltrimethoxysilane, vinyltriethoxysilane and γ-glycidoxypropyltrimethoxysilane. Various kinds of alkoxysilane commercially available as silane coupling agents may also be used.

Among these examples of alkoxysilane, preferred is a tetraalkoxysilane such as tetramethoxysilane, tetraethoxysilane and tetrapropoxysilane or an oligomer thereof, and particularly preferred is a tetraalkoxysilane in which each alkoxy group has three or less carbon atoms or an oligomer thereof. When a condensation reaction occurs during a baking process, a coating can be formed to have a three-dimensional cross-linked structure thereby easily improving the coating strength. In addition, cracks are unlikely to grow because the volume contraction is relatively small during the condensation.

It is preferred that the amount of the above organic silicon compound is 5 mass % or more and 40 mass % or less relative to the whole paint. If the amount is less than 5 mass %, then the coating strength tends to decrease. If the added amount is further less, then obvious voids may occur among metal-based powder to deteriorate the rust-preventive function. If, on the other hand, an excessive amount is added over 40 mass %, then the rust-preventive function tends to deteriorate because the contained amount of the first metal-based powder is relatively reduced in the first coating. In addition, the function of suppressing cracks from progressing may possibly be deteriorated because the overlapping areas of powders of the first metal-based powder to be laminated become small. Particularly preferred range is 10 mass % or more and 35 mass % or less.

The first paint composition according to the present example contains an organic titanate compound as one of components that constitute the inorganic binder. Containing the organic titanate compound prevents cracks from occurring in the first coating obtained by performing a baking process at a high temperature.

The organic titanate compound means an organic compound represented by a general formula of $Ti(X)_4$ and an oligomer thereof. Each X herein is selected from hydroxyl group, lower alkoxy groups and chelating substituent groups, and the four Xs may be identical or different.

The lower alkoxy group means an alkoxy group has six or less carbon atoms, preferably four or less, such as methoxy, ethoxy, propoxy, isopropoxy, butoxy, isobutoxy, and tert-butoxy.

The chelating substituent group means a group derived from an organic compound having a chelate forming ability. Examples of such an organic compound include: a β-diketone such as acetylacetone; an alkylcarbonylcabonic acid such as acetoacetic acid and ester thereof; a hydroxy acid such as lactic acid; and an alkanolamine such as triethanolamine. Specific examples of the chelating substituent group include lactate, ammoniumlactate, triethanolaminate, acetylacetonate, acetoacetate, and ethylacetoacetate.

This organic titanate compound exhibits a high functionality when added with a small amount as will be described later. That is, when subjected to a baking process at a high temperature, the added organic titanate compound acts as a curing agent or a catalyst to facilitate a three-dimensional cross-linking reaction of the organic silicon compound. Consequently, the curing rate of the binder component increases to thereby suppress cracks from progressing.

Moreover, the presence of this organic titanate compound also facilitates the chemical bond between the organic silicon compound and the first metal-based powder and the chemical bond between the organic silicon compound and a substrate (such as a steel material), thus enhancing the bonding strengths. This allows for preventing interfacial delamination between the first metal-based powder and the binder, and between the substrate and the binder, thereby to suppress cracks from progressing.

It is preferred that the adding amount of the organic titanate compound is 0.05% or more and 2.0% or less. If the amount of the organic titanate compound is unduly small, then the effect thereof cannot be obtained and large cracks are likely to occur in the coating, thus resulting in a possibility that the rust-preventive property of the first coating will deteriorate. In view of stably suppressing the occurrence of cracks which negatively affect the rust-preventive property, it is more preferred that the adding amount of the organic titanate compound is 0.10% or more. If, on the other hand, the adding amount of the organic titanate compound is unduly large, then the coating is likely to absorb ambient moisture thereby to be hydrolyzed, thus having a tendency of reduced pot life. In view of stably suppressing the pot life from being reduced to such an extent that negatively affects the productivity, it is more preferred that the adding amount of the organic titanate compound is 0.15% or less.

The first paint composition according to the present example contains organic solvent thereby being wettable to a member to be painted during the coating operation, and a coating having high adhesive property can be achieved. In addition, containing the organic solvent allows wide variety of additive agents to be utilized when they are added to make the paint.

Preferable examples of the organic solvent include: alcohols such as methanol, ethanol, propanol, isopropanol, butanol, hexanol, methoxybutanol and methoxymethylbutanol; esters of these alcohols such as acetic acid ester and propionic acid ester; glycols such as ethylene glycol, diethylene glycol, triethylene glycol, polyethylene glycol, propylene glycol, dipropylene glycol and tripropylene glycol; and ethers of these glycols such as monomethyl ether, monoethyl ether and monobutyl ether. In addition, hydrocarbons may also be used, such as toluene, xylene, mineral spirit and solvent naphtha. These may be used alone or as a mixture of two or more thereof.

The contained amount of the organic solvent in the first paint composition is 10% or more and 60% or less according to the present example. If the contained amount of the organic solvent is less than 10%, then the thickness of a liquid layer obtained by coating the first paint composition on a substrate is difficult to be reduced within a desirable range, and/or the thickness of the first coating, which is obtained by baking the substrate provided thereon with the liquid layer, is difficult to be reduced to within a desirable range. In addition, the thickness of the liquid layer may not be even, so that variations may occur in thickness of the obtained first coating. In view of stably suppressing the occurrence of such troubles in regard to the thickness of the first coating, the contained amount of the organic solvent is preferably 15% or more, and further preferably 20% or more. If, on the other hand, the contained amount of the organic solvent exceeds 60%, then, in contrast, there is a concern that the thickness of the first coating is difficult to be increased to within a desirable range. In addition, there is also a concern that the desirable structure in the first coating according to the present embodiment is difficult to be formed, in which the first metal-based powder has a scale form and is located to have regions where powders of the first metal-based powder are laminated in the first coating. In view of stably suppressing such concerns from occurring, the contained amount of the organic solvent is preferably 45% or less, and further preferably 30% or less.

The first paint composition according to the present example may contain, if needed, any of various additive agents used for paints in general. Examples of such additive agents include metal-based compounds, resins, lubricant agents, antifoam agents, coloring pigments, rust-preventive pigments, thickening agents and colloidal silica fine particles.

Examples of metal-based components include oxides, and specifically oxides of magnesium, cobalt, zirconium, nickel, vanadium and molybdenum.

Examples of resins include phenol resin, epoxy resin, acrylic resin, acrylic styrene resin, urethane resin, alkyd resin and melamine resin. Note that the first binder component contained in the first paint composition according to the present example is an inorganic-based binder component, and therefore, the contained amount of the organic binder comprised of such resins is less than the contained amount of the inorganic binder. That is, the mass ratio of contained amount of the inorganic binder and the contained amount of the organic binder (inorganic/organic) is more than one, preferably 10 or more, and further preferably 20 or more.

Examples of lubricant agents include oxidized polyethylene, oxidized polyolefin, graphite and molybdenum disulfide.

Examples of antifoam agents include silicon-based antifoam agents and non-silicon-based antifoam agents, and surface-activating agents may also be used.

Examples of coloring pigments include inorganic pigments such as iron oxide and ultramarine blue, and organic pigments such as azo pigment and polycyclic pigment.

Examples of rust-preventive pigments include zinc phosphate, magnesium phosphate, zinc molybdate, aluminum phosphomolybdate and other pigments.

Examples of thickening agents include organic thickening agents such as fatty acid amide, polyamide, oxidized polyethylene and hydroxylpropyl cellulose, and inorganic thickening agents such as silicate salt based compound.

The colloidal silica fine particles are fine sol silica particles having a particle size of 1 μm or less and have an advantageous effect of improving the anticorrosive property and the coating strength, like the above-described silicon compound. Examples of the colloidal silica fine particles includes organosilica sol in which colloidal silica is dispersed in an organic solvent (e.g. SNOWTEX available from Nissan Chemical Industries, Ltd.), and fumed silica (gaseous phase silica).

In addition, commonly used additive agents for paints may also be contained in the first paint composition according to the present example, such as wetting agent, dispersing agent, surface conditioning agent, and rheology controlling material.

These additional additive agents are preferably added with a total amount of 0.1% or more and 10% or less relative to the whole paint. If the amount is less than 0.1%, then the additive agents may not effectively work. If, on the other hand, the amount is more than 10%, then the composition ratio of the first metal-based powder and the binder component as main agents is relatively decreased, and the rust-preventive coating with favorable gloss and excellent anticorrosive property may be difficult to be obtained.

Aforementioned each component that constitutes the first paint composition according to the present example may comprise one or more types.

Note that the first paint composition according to the present example is preferred to be substantially free from hexavalent chromium based substances.

Manufacturing method for the first paint composition according to the present example is not particularly limited. For example, the first paint composition may be prepared by sufficiently stirring/mixing the above-described components to uniformly disperse the first metal-based powder into the liquid.

4. Thickness of Coating

Although the thickness of the rust-preventing coating according to the present embodiment is not particularly limited, the thickness is preferred to be within a range of 4 μm to 60 μm. If the rust-preventive coating is unduly thin, then the thickness of the first coating and/or the second coating which constitutes the rust-preventive coating becomes unduly thin. In this case, the metal-based powder contained in such an unduly thin coating easily drops off, and there is a concern that the anticorrosive property of the coating may be deteriorated. In order to stably avoid the problem that such deterioration in anticorrosive property becomes significant, the thickness of the rust-preventive coating is preferred to be 6 μm or more.

If the rust-preventive coating is unduly thick, then, when the first coating and/or the second coating which constitutes the rust-preventive coating is formed from the paint composition for the coating, the contraction amount especially increases from the liquid layer comprised of the paint to the coating, and the possibility that cracks occur to negatively affect the anticorrosive property may even be increased depending on the paint composition. In addition, if the coating which constitutes the rust-preventive coating is thick, then the cost for manufacturing the coating will increase. In view of stably suppressing the possibility of the above occurrence of cracks, the rust-preventive coating preferably has a thickness of 30 μm or less, and more preferably 20 μm or less.

It is preferred that respective thicknesses of the first coating and the second coating are within a range of 2 μm to 30 μm based on the determination that a preferred range is set for the thickness of the rust-preventive coating. It is further preferred that each coating thickness for the first coating and the second coating is 4 μm or more and 20 μm or less, and most preferred is 4 μm or more and 15 μm or less.

5. Manufacturing Method for Coatings

The manufacturing method for the rust-preventive coating according to the present embodiment is not limited. The rust-preventive coating according to the present embodiment is such that the first coating is formed on the substrate and the second coating is formed thereon so as to contact therewith, and it is thus a common practice to form a liquid layer comprised of the first paint composition on the substrate thereby forming the first coating from that liquid layer, and form a liquid layer comprised of the second paint composition on the formed first coating thereby forming the second coating from that liquid layer. Methods for manufacturing coatings from these paint compositions have common features, so a specific example will be described below where the first coating is manufactured from the first paint composition. Note that a process for forming a coating from a liquid layer comprised of a paint composition is also referred to as a curing process.

A specific method for forming the liquid layer comprised of the first paint composition is not particularly limited, and any known coating method may appropriately be employed with consideration for the material and shape of a substrate.

Specific examples of the coating method include roll-coating, spraying, brush painting and dipping. The thickness of the liquid layer comprised of the first paint composition may be set in consideration of the composition of the first paint composition so that the thickness of the first coating will be within a desired range. Details of the curing process are also to appropriately be configured on the basis of compositions of respective paint compositions. Such details may include heating and/or radiating an energy ray such as ultraviolet ray and electron beam. A certain composition of the paint composition may be cured merely by being exposed to the air.

The case where the first paint composition is the above nonaqueous inorganic paint composition will be described in some detail. In this case, the first coating is obtained by a process for heating the liquid layer, i.e. a baking process, and specifically it may be performed by heating the liquid layer at a temperature of 200° C. to 400° C. during 10 minutes or more and 120 minutes or less. This baking process causes the organic silicon compound to develop a condensation reaction associated with the organic titanate compound as a curing agent or a catalyst, and the surface of a substrate is formed thereon with the first coating, which is a coating that contains the first metal-based powder. If the heating temperature in the baking process is unduly low, then specifically long time is required for the above condensation reaction to be completed, and the obtained coating may deteriorate its anticorrosive property because the above condensation reaction would not have been completed in the coating. In view of reducing the amount of time required for the above condensation reaction to enhance the productivity, the heating temperature is preferably 230° C. or higher, and more preferably 250° C. or higher. If, on the other hand, the heating temperature is unduly high, then the liquid layer is difficult to be uniformly heated, and the anticorrosive property of the obtained first coating may possibly be deteriorated. In addition, some substrates may have problems such as deformation and oxidation if the heating temperature is unduly high. Therefore, the upper limit of the heating temperature is preferably about 400° C., and more preferably 300° C. or lower.

Prior to the above baking process, a preheating may be performed to heat the liquid layer at a temperature of 200° C. or lower so that the organic solvent contained in the liquid layer is preferentially evaporated.

Although the above description is directed to the case where an operation comprising the process for forming the liquid layer and the curing process is performed once for forming the first coating, the operation may be iteratively performed. In this case, the first coating is configured as a laminated body of a plurality of coatings. The manufacturing process may be complicated by repeating the operation, but as the curing step is repeated, the negative effect of cracks occurring in the coating can be suppressed thereby also suppressing the deterioration of the anticorrosive property due to the occurrence of cracks in the first coating.

6. Substrate

Although types of a substrate to be formed thereon with the first coating according to the present embodiment are not particularly limited, if the baking process is performed at a high temperature as the above, the substrate is preferred to be formed of a material such that dimensions of the substrate may not considerably change due to the baking process and oxidation may not be significant within regions other than the region where the first coating is formed.

A material typically used for the substrate according to the present embodiment is a steel material, and other examples thereof include copper-based materials and nickel-based materials. The surface of the steel material may preliminarily be coated by a metal such as zinc. Typical example of a method for performing such a coating is plating. Alternatively or additionally, physical process such as shotblasting process may be performed and/or chemical process may be performed, such as chemical conversion process (e.g. phosphate coating process for a material of steel).

The shape of the substrate according to the present embodiment may be freely selected, and the substrate may be a primary processed product such as plate materials, rod materials and pipe materials, or a secondary processed product such as bolts, nuts, hinges, engine blocks, gaskets and housings. Examples of processes for such a secondary processed product include cutting/grinding, press working, bending work, cutting process, casting process, forging process and other processes.

7. Rust-Preventive Member

The rust-preventive member according to the present embodiment comprises a rust-preventive coating on the above substrate, and the rust-preventive coating comprises the first coating and the second coating as described above. Comprising this rust-preventive coating allows the rust-preventive member to have a particularly excellent anticorrosive property.

The rust-preventive member according to the present embodiment may further comprise an overcoat on the rust-preventive coating.

The overcoat layer can be formed using a method and coating liquid known in the art. The overcoat layer is preferred to be a transparent one, i.e. a clear coat layer, so as not to diminish the color tone of the underlying rust-preventive coating. Specifically, types of the overcoat layer are categorized into inorganic ones, such as using metallic oxides (or precursor substances thereof) including colloidal silica (silica sol) and titania sol or phosphoric salts, and organic ones comprised of thin resin coatings (e.g. polyester, acrylic resin, epoxy resin, phenol resin, polyurethane, melamine resin, fluorine resin and other resins), wherein any type may be used. The thickness thereof may commonly be, such as, but not limited to, within a range of about 0.1 μm to about 30 μm. In general, the overcoat layer is funned by coating and drying the process liquid, and the coating may be performed depending on the shape of the substrate by appropriate means such as dipping, spraying and roll-coating. The drying may commonly be drying by heating.

8. Variation

While the rust-preventive coating according to the present embodiment is configured such that the first coating and the second coating are formed on the substrate in this order to contact with each other, a rust-preventive coating may be configured by laminating three or more types of coatings. Also in this case, it is enough if each coating contains metal-based powder and at least neighboring two laminated coatings have different compositions.

EXAMPLES

The present invention will hereinafter be described in more detail with reference to specific experimental results, but the scope of the present invention is not to be limited to these experimental results.

(1) Preparation of Paints

Zinc powder of scale form was prepared as below. Metal zinc powder of 100 parts by weight with an average particle size of 5 μm was dispersed into 200 parts by weight of mineral spirit and a small amount of fatty acid was further added thereto, and slurry was obtained to have a dispersion concentration of the metal zinc powder of about 30 weight %. After being subjected to a crush treatment using a bead mill (Star Mill ZRS available from Ashizawa Finetech Ltd.), the treated slurry was evaporatively dried under reduced pressure, and scale form zinc powder was thus obtained, wherein the center value of longitudinal diameter distribution was 10 μm and the center value of thickness distribution was 0.3 μm.

Five types of scale form aluminum powder (ALPASTE available from Toyo Aluminium K.K.) were also prepared as shown in Table 1.

TABLE 1

| Type of aluminum | Center value of distribution of longitudinal diameter (μm) | Center value of distribution of thickness (μm) |
|---|---|---|
| A | 8 | 0.1 |
| B | 5 | 0.1 |
| C | 11 | 0.1 |
| D | 14 | 0.1 |
| E | 17 | 0.1 |

Paints No. 1 to No. 12 as nonaqueous paints were produced by stirring components for each paint to mix them according to each composition (parts by mass) shown in Table 2 during three hours using a high-speed stirrer for paints.

TABLE 2

|  |  | No. 1 | No. 2 | No. 3 | No. 4 | No. 5 | No. 6 | No. 7 | No. 8 | No. 9 | No. 10 | No. 11 | No. 12 |
|---|---|---|---|---|---|---|---|---|---|---|---|---|---|
| Ethyl polysilicate | | 300 | 300 | 300 | 300 | 300 | 300 | 300 | 300 | 300 | 300 | 300 | 300 |
| Tetra-n-butoxy titanium polymer | | 5 | 5 | 5 | 5 | 5 | 5 | 5 | 5 | 5 | 5 | 5 | 5 |
| Zinc powder | | 380 | 380 | 380 | 380 | 380 | 450 | 405 | 360 | 340 | 315 | 270 | 225 |
| Aluminum powder | A | 70 | | | | | | | | | | | |
| | B | | 70 | | | | | | | | | | |
| | C | | | 70 | | | | | | | | | |
| | D | | | | 70 | | | 45 | 90 | 110 | 135 | 180 | 225 |
| | E | | | | | 70 | | | | | | | |
| 3-ethoxy ethyl propionate | | 80 | 80 | 80 | 80 | 80 | 80 | 80 | 80 | 80 | 80 | 80 | 80 |
| Methyl methoxy butanol | | 120 | 120 | 120 | 120 | 120 | 120 | 120 | 120 | 120 | 120 | 120 | 120 |
| Dispersing agent | | 30 | 30 | 30 | 30 | 30 | 30 | 30 | 30 | 30 | 30 | 30 | 30 |
| Phenol resin | | 5 | 5 | 5 | 5 | 5 | 5 | 5 | 5 | 5 | 5 | 5 | 5 |
| Thickening agent | | 10 | 10 | 10 | 10 | 10 | 10 | 10 | 10 | 10 | 10 | 10 | 10 |
| Aluminum powder ratio in metal powder | | 16% | 16% | 16% | 16% | 16% | 0% | 10% | 20% | 24% | 30% | 40% | 50% |

Details of components shown in Table 2 were as follows:

ethyl polysilicate: Ethyl Silicate 40 available from COLCOAT CO., LTD.;

tetra-n-butoxy titanium polymer: B-10 available from Nippon Soda Co., Ltd.;

dispersing agent: oxidized polyolefin available from Kusumoto Chemicals, Ltd.;

phenol resin: phenol-formaldehyde resin available from DIC Corporation; and thickening agent: bentonite available from HOJUN Co., Ltd.

Note that the "aluminum powder ratio in metal powder" in Table 2 is a ratio (unit:mass %) of the contained amount of the aluminum powder to the total contained amount of the zinc powder and the aluminum powder.

(2) Preparation of Samples for Anticorrosive Property Evaluation

After degreasing and washing treatments using known methods in the art, shotblasting treatment (alumina blast) was performed for M10 steel bolts.

Obtained bolts were put into a barrel and the barrel was then immersed into and pulled out from one type of paints No. 1 to No. 12 shown in Table 2, and thereafter the barrel storing the bolts each deposited thereon with a liquid layer comprised of the paint was rotated to adjust the thickness of the liquid layer on each bolt. After completing the rotation, the bolts were taken out from the barrel and subjected to a baking process for heating the bolts in an oven at 260° C. during 60 minutes. The bolts after the baking process were taken out from the oven and naturally cooled to room temperature, and the bolts were thus obtained each with a coating (lower layer coating) of 4 μm thickness on the surface thereof.

Subsequently, the bolts each provided thereon with the above lower layer coating were put again into a barrel and the barrel was then immersed into and pulled out from one type of paints No. 1 to No. 12 shown in Table 2, and thereafter, the barrel storing the bolts where a liquid layer comprised of the paint was deposited on each lower layer coating was rotated to adjust the thickness of the liquid layer on the lower layer coating. After completing the rotation, the bolts were taken out from the barrel and subjected to a baking process for heating the bolts in an oven at 260° C. during 60 minutes. The bolts after the baking process were taken out from the oven and naturally cooled to room temperature, and the bolts were thus obtained each with a new coating (upper layer coating) of 4 μm thickness on the lower layer coating. In that way, samples for anticorrosive property evaluation were obtained in each of which a rust-preventive coating of total 8 μM thickness was formed on the bolt surface.

(3) Evaluation

The following evaluation was performed using the obtained samples for anticorrosive property evaluation.

An apparatus in compliance with JIS Z2371 was used to perform neutral salt spray test on the basis of JIS H8502. Samples were visually observed every 24 hours, and the testing time when red rust was recognized first to occur was determined as a red rust occurring time to be used to evaluate the anticorrosive property. If the red rust occurring time was shorter than 1,000 hours, then the anticorrosive property was judged to be poor.

Evaluation results are shown in Table 3. The "RL" used in Table 4 represents a ratio (unit:mass %) of the contained amount of aluminum powder to the total contained amount of zinc powder and aluminum powder in the paint for providing the lower layer coatings. In addition, the "RU" represents a ratio (unit:mass %) of the contained amount of aluminum powder to the total contained amount of zinc powder and aluminum powder in the paint for providing the upper layer coatings. Further, the "RU/RL" is a value obtained by dividing the above ratio RU of the contained amount of aluminum powder in the paint for providing the upper layer coatings by the ratio RL of the contained amount of aluminum powder in the paint for providing the lower layer coatings, where the ratio RL of 0 mass % is denoted by hyphen (-).

TABLE 3

| Sample No. | Lower layer coating | | | Upper layer coating | | | | Anticorrosive property |
|---|---|---|---|---|---|---|---|---|
| | Paint No. | Aluminum powder | $R_L$ (mass %) | Paint No. | Aluminum powder | $R_U$ (mass %) | $R_U/R_L$ | evaluation (hours) |
| 1-1 | 1 | A | 15 | 1 | A | 15 | 1 | 2,424 |
| 1-2 | 1 | A | 15 | 2 | B | 15 | 1 | 2,424 |
| 1-3 | 1 | A | 15 | 3 | C | 15 | 1 | 2,448 |
| 1-4 | 1 | A | 15 | 4 | D | 15 | 1 | 2,640 |
| 1-5 | 1 | A | 15 | 5 | E | 15 | 1 | 2,640 |
| 1-6 | 1 | A | 15 | 6 | Not containing | 0 | 0 | 1,128 |
| 1-7 | 1 | A | 15 | 7 | D | 10 | 0.67 | 1,608 |
| 1-8 | 1 | A | 15 | 8 | D | 20 | 1.3 | 3,600 |
| 1-9 | 1 | A | 15 | 9 | D | 25 | 1.7 | 4,080 |
| 1-10 | 1 | A | 15 | 10 | D | 30 | 2 | 4,200 |
| 1-11 | 1 | A | 15 | 11 | D | 40 | 2.7 | 3,120 |
| 1-12 | 1 | A | 15 | 12 | D | 50 | 3.3 | 1,920 |
| 1-13 | 2 | B | 15 | 1 | A | 15 | 1 | 2,424 |
| 1-14 | 3 | C | 15 | 1 | A | 15 | 1 | 2,400 |
| 1-15 | 4 | D | 15 | 1 | A | 15 | 1 | 2,280 |
| 1-16 | 5 | E | 15 | 1 | A | 15 | 1 | 2,160 |
| 1-17 | 6 | Not containing | 0 | 1 | A | 15 | — | 2,328 |
| 1-18 | 7 | D | 10 | 1 | A | 15 | 1.5 | 2,880 |
| 1-19 | 8 | D | 20 | 1 | A | 15 | 0.75 | 2,424 |
| 1-20 | 9 | D | 25 | 1 | A | 15 | 0.6 | 2,040 |
| 1-21 | 10 | D | 30 | 1 | A | 15 | 0.5 | 1,920 |
| 1-22 | 11 | D | 40 | 1 | A | 15 | 0.38 | 1,680 |
| 1-23 | 12 | D | 50 | 1 | A | 15 | 0.3 | 1,680 |
| 1-24 | 6 | Not containing | 0 | 4 | D | 15 | — | 2,352 |
| 1-25 | 7 | D | 10 | 4 | D | 15 | 1.5 | 2,904 |
| 1-26 | 6 | Not containing | 0 | 12 | D | 50 | — | 1,920 |
| 1-27 | 12 | D | 50 | 6 | Not containing | 0 | 0 | 960 |
| 1-28 | 7 | D | 10 | 11 | D | 40 | 4 | 2,640 |
| 1-29 | 11 | D | 40 | 7 | D | 10 | 0.25 | 1,128 |
| 1-30 | 8 | D | 20 | 10 | D | 30 | 1.5 | 4,080 |
| 1-31 | 10 | D | 30 | 8 | D | 20 | 0.67 | 2,400 |
| 1-32 | 1 | A | 15 | 1 | A | 15 | 1 | 2,424 |
| 1-33 | 2 | B | 15 | 2 | B | 15 | 1 | 2,400 |
| 1-34 | 3 | C | 15 | 3 | C | 15 | 1 | 2,448 |
| 1-35 | 4 | D | 15 | 4 | D | 15 | 1 | 2,472 |
| 1-36 | 5 | E | 15 | 5 | E | 15 | 1 | 2,424 |
| 1-37 | 6 | Not containing | 0 | 6 | Not containing | 0 | — | 1,128 |
| 1-38 | 7 | D | 10 | 7 | D | 10 | 1 | 1,608 |
| 1-39 | 8 | D | 20 | 8 | D | 20 | 1 | 2,280 |
| 1-40 | 9 | D | 25 | 9 | D | 25 | 1 | 1,652 |
| 1-41 | 10 | D | 30 | 10 | D | 30 | 1 | 1,292 |
| 1-42 | 11 | D | 40 | 11 | D | 40 | 1 | 1,104 |
| 1-43 | 12 | D | 50 | 12 | D | 50 | 1 | 960 |

The invention claimed is:

1. A rust-preventive coating comprising a laminated body comprising two layers of coatings contacted with each other, wherein among the two layers of coatings, a first coating as a coating at an inner layer side is obtained from a first paint composition that contains a first metal-based powder and a first binder component, among the two layers of coatings, a second coating as a coating at an outer layer side is obtained from a second paint composition that contains a second metal-based powder and a second binder component, and the first metal-based powder comprises a first zinc-based powder comprising one or more selected from zinc powders and zinc alloy powders and a first aluminum-based powder, and the second metal-based powder comprises: a second zinc-based powder comprising one or more selected from zinc powders and zinc alloy powders; and a second aluminum-based powder comprising one or more selected from aluminum powders and aluminum alloy powders, wherein $RL<RU \leq 2.7RL$ is satisfied where RL represents a first aluminum ratio as a mass ratio of the first aluminum-based powder to a total of the first zinc-based powder and the first aluminum-based powder of the first metal-based powder and RU represents a second aluminum ratio as a mass ratio of the second aluminum-based powder to a total of the second zinc-based powder and the second aluminum-based powder of the second metal-based powder.

2. The rust-preventive coating as set forth in claim 1, wherein the second aluminum ratio RU as the mass ratio of the second aluminum-based powder to whole of the second metal-based powder is less than 50 mass %.

3. The rust-preventive coating as set forth in claim 1, wherein at least one of the first metal-based powder and the second metal-based powder has a scale form.

4. The rust-preventive coating as set forth claim 1, wherein
a contained amount of the first metal-based powder in the first paint composition is 20 mass % or more and 60 mass % or less, and
a contained amount of the second metal-based powder in the second paint composition is 20 mass % or more and 60 mass % or less.

5. The rust-preventive coating as set forth in claim 1, wherein at least one of the first binder component and the second binder component contains an inorganic binder component.

6. The rust-preventive coating as set forth in claim 5, wherein the inorganic binder component includes, on the basis of whole paint, 5 mass % or more and 40 mass % or less of an organic silicon compound and 0.05 mass % or more and 2 mass % or less of an organic titanate compound.

7. The rust-preventive coating as set forth in claim 6, wherein the organic silicon compound contained in the inorganic binder component comprises one or more compounds selected from the group consisting of tetraalkyl silicate compounds having an alkyl group which has one to three carbon atoms and oligomers thereof.

8. The rust-preventive coating as set forth in claim 6, wherein the organic titanate compound contained in the inorganic binder component comprises an organic compound represented by a general formula of $Ti(X)_4$ and an oligomer thereof, where X represents one or more functional groups selected from the group consisting of: alkoxy groups having one to four carbon atoms; chelating substituent groups; and hydroxyl group.

9. The rust-preventive coating as set forth in claim 1, wherein at least one of the first binder component and the second binder component contains an organic binder component.

10. The rust-preventive coating as set forth in claim 1, wherein at least one of the first paint composition and the second paint composition is a nonaqueous composition.

11. A rust-preventive member comprising the rust preventive coating as set forth in claim 1 on a substrate.

12. The rust-preventive member as set forth in claim 11, further comprising an overcoat layer provided at outside the rust-preventive coating.

13. The rust-preventive coating as set forth claim 1, wherein $1.3RL \leq RU \leq 2RL$ is satisfied.

* * * * *